United States Patent
Pierce et al.

(10) Patent No.: US 9,327,571 B2
(45) Date of Patent: May 3, 2016

(54) MECHANICAL AXLE/SUSPENSION SPRING SEATS FOR THIN-WALL AXLES

(71) Applicant: HENDRICKSON USA, L.L.C., Itasca, IL (US)

(72) Inventors: Phillippi R. Pierce, Canton, OH (US); Michael D. Oyster, Stow, OH (US); Dane Gregg, Uniontown, OH (US)

(73) Assignee: Hendrickson USA, LLC, Itasca, IL (US)

( * ) Notice: Subject to any disclaimer, the term of this patent is extended or adjusted under 35 U.S.C. 154(b) by 0 days.

(21) Appl. No.: 14/328,778

(22) Filed: Jul. 11, 2014

(65) Prior Publication Data

US 2015/0014953 A1 Jan. 15, 2015

Related U.S. Application Data

(60) Provisional application No. 61/845,745, filed on Jul. 12, 2013.

(51) Int. Cl.
*B60G 11/113* (2006.01)

(52) U.S. Cl.
CPC ...... *B60G 11/113* (2013.01); *B60G 2204/4306* (2013.01); *B60G 2206/8201* (2013.01)

(58) Field of Classification Search
CPC ............... B60G 5/047; B60G 21/045; B60G 2204/4306; B60G 11/113; B60G 2206/8201
USPC .................... 280/682, 686, 788, 789, 124.11, 280/124.116, 124.128, 124.153
See application file for complete search history.

(56) References Cited

U.S. PATENT DOCUMENTS

| | | | |
|---|---|---|---|
| 2,660,450 A | 3/1949 | Stignum et al. | |
| 3,785,673 A | 1/1974 | Harbers, Jr. et al. | |
| 5,037,126 A | 8/1991 | Gottschalk et al. | |
| 5,366,237 A | 11/1994 | Dilling et al. | |
| 5,476,251 A * | 12/1995 | Moses et al. | 267/52 |
| 5,634,655 A | 6/1997 | Chalin | |
| 5,690,353 A | 11/1997 | Vandenberg | |
| 6,240,806 B1 | 6/2001 | Morris et al. | |
| 6,508,482 B2 | 1/2003 | Pierce et al. | |
| 6,725,743 B2 * | 4/2004 | White | 74/607 |
| 7,007,960 B2 | 3/2006 | Chalin et al. | |
| 7,267,348 B1 * | 9/2007 | Klein et al. | 280/124.128 |
| 7,347,435 B2 | 3/2008 | Chalin | |
| 7,360,774 B2 * | 4/2008 | Saieg et al. | 280/124.128 |
| 7,669,866 B2 * | 3/2010 | Peaker et al. | 280/124.128 |
| 7,726,673 B2 * | 6/2010 | Saieg et al. | 280/124.128 |
| 7,740,255 B2 * | 6/2010 | Holt | 280/124.128 |
| 8,006,987 B2 * | 8/2011 | Saieg et al. | 280/124.116 |
| 8,333,396 B2 * | 12/2012 | Saieg et al. | 280/124.128 |
| 8,419,029 B2 * | 4/2013 | Muckelrath et al. | 280/124.116 |
| 8,454,040 B2 | 6/2013 | Westnedge et al. | |

(Continued)

*Primary Examiner* — Laura Freedman
(74) *Attorney, Agent, or Firm* — Dureska & Moore, LLC; David P. Dureska (57) ABSTRACT

The invention relates to a spring seat for a mechanical spring axle/suspension system that includes continuous window welds and facilitates the use of a thin-wall axle, thereby saving weight and cost. The seat secures at least one mechanical spring of the axle/suspension system to an axle of the axle/suspension system. The spring seat comprises at least one body configured to seat on the axle, and the body forms at least one window when disposed on the axle. The body is rigidly attached to the axle by a continuous weld formed in the window. The spring seat is free of a line weld between the body and the axle.

12 Claims, 10 Drawing Sheets

(56) References Cited

U.S. PATENT DOCUMENTS

| | | | |
|---|---|---|---|
| 8,490,989 B2 * | 7/2013 | Piehl et al. ............... | 280/124.11 |
| 8,528,923 B2 * | 9/2013 | Wakefield et al. ..... | 280/124.116 |
| 8,678,407 B2 * | 3/2014 | Eveley ................... | 280/124.116 |
| 8,770,604 B2 * | 7/2014 | Brereton et al. ........ | 280/124.128 |
| 8,919,793 B1 * | 12/2014 | Klein et al. ............ | 280/124.116 |
| 8,925,574 B2 * | 1/2015 | Wilson et al. ................. | 137/351 |
| 9,193,236 B2 * | 11/2015 | Westnedge ............... | B60G 5/03 |
| 2001/0020775 A1 | 9/2001 | Pierce et al. | |
| 2006/0181047 A1 * | 8/2006 | Chamberlin et al. .. | 280/124.128 |
| 2009/0072505 A1 * | 3/2009 | McGinnis .............. | 280/124.116 |
| 2011/0095501 A1 | 4/2011 | Piehl et al. | |
| 2011/0221156 A1 | 9/2011 | Muckelrath et al. | |
| 2012/0080573 A1 | 4/2012 | Fulton et al. | |
| 2012/0080862 A1 * | 4/2012 | Westnedge .............. | B23P 11/00 |
| | | | 280/124.1 |
| 2013/0277936 A1 * | 10/2013 | Westnedge et al. .... | 280/124.116 |
| 2014/0117176 A1 | 5/2014 | Pierce et al. | |
| 2015/0014512 A1 * | 1/2015 | Pierce et al. .................. | 248/674 |

* cited by examiner

MECHANICAL AXLE/SUSPENSION SPRING SEATS FOR THIN-WALL AXLES

CROSS-REFERENCE TO RELATED APPLICATION

This application claims the benefit of U.S. Provisional Patent Application Ser. No. 61/845,745, filed Jul. 12, 2013.

BACKGROUND OF THE INVENTION

1. Field of the Invention

The present invention relates to the art of mechanical axle/suspension systems for vehicles. More particularly, the invention relates to the art of mechanical spring axle/suspension systems for heavy-duty vehicles, such as tractor-trailers or semi-trailers, which locate the vehicle axle(s) and stabilize the vehicle during vehicle operation. Still more particularly, the invention relates to a spring seat for a mechanical spring axle/suspension system that includes continuous window welds and enables the use of a thin-wall axle, thereby saving weight and cost.

2. Background Art

Heavy-duty vehicles that transport freight, for example, tractor-trailers or semi-trailers and straight trucks, include suspension assemblies that connect the axles of the vehicle to the frame of the vehicle. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience, reference herein will be made to a subframe, with the understanding that such reference is by way of example, and that the present invention applies to heavy-duty vehicle primary frames, movable subframes and non-movable subframes.

In the heavy-duty vehicle art, reference is often made to an axle/suspension system, which typically includes a pair of transversely-spaced suspension assemblies and the axle that the suspension assemblies connect to the vehicle subframe. The axle/suspension system of a heavy-duty vehicle acts to locate or fix the position of the axle and to stabilize the vehicle. More particularly, as the vehicle is traveling over-the-road, its wheels encounter road conditions that impart various forces to the axle on which the wheels are mounted, and in turn, to the suspension assemblies that are connected to and support the axle. These forces consequently act to place or create loads on the axle and the suspension assemblies. In order to minimize the detrimental effect of these forces and resulting loads on the vehicle subframe and other vehicle components as the vehicle is operating, and in turn on any cargo and/or occupants being carried by the vehicle, the axle/suspension system is designed to absorb or dampen at least some of the forces and/or resulting loads.

Two common types of heavy-duty vehicles are known in the art as dry freight vans and refrigerated vans. Dry freight vans include enclosed trailers to keep their freight dry, and are used to transport a wide variety of non-perishable consumer and industrial goods. Refrigerated vans include enclosed trailers with refrigeration systems, and typically are used to transport perishable goods. Such dry freight vans and refrigerated vans have traditionally employed axle/suspension systems that utilize mechanical spring suspension assemblies. These mechanical spring suspension assemblies typically include a pair of leaf spring sets or stacks that are transversely spaced and are connected to the axle. The pair of leaf spring sets is typically connected to the axle utilizing U-bolt connection so as to not compromise the integrity of the springs. Each leaf spring stack is engineered to carry the rated vertical load of its respective axle. Ordinarily, a trailer of a dry freight or refrigerated van employs one or more mechanical spring axle/suspension systems at the rear of the trailer, that is, a front axle/suspension system and a rear axle/suspension system, which is a configuration that is collectively referred to in the art as a trailer tandem axle/suspension system. As is known to those skilled in the art, the front end of the trailer is supported by a separate axle/suspension system of the tractor. For the purpose of convenience, reference herein shall be made to a spring axle/suspension system, or a mechanical axle/suspension system, with the understanding that such reference is to a trailer tandem mechanical spring axle/suspension system.

It is understood that each one of the front and rear spring axle/suspension systems includes a generally identical pair of transversely-spaced, longitudinally-extending leaf spring sets or stacks, each one of which is disposed on a respective one of the driver's side and passenger side of the vehicle. Inasmuch as each leaf spring set of each front and rear spring axle/suspension system is generally identical to the other, only one of each of the front and rear leaf spring sets will be described herein. In the prior art, spring axle/suspension systems have utilized a clamp assembly to connect each leaf spring set to the axle.

More particularly, the clamp assembly includes a top block that is disposed on the upper surface of the leaf spring, a top axle seat that extends between the bottom of the leaf spring and the upper portion of the axle in alignment with the top block, and a bottom axle seat, which is a curved plate disposed on the lower portion of the axle in alignment with the top block and the top axle seat. The clamp assembly also includes a pair of U-bolts, each one of which engages top block and extends through a pair of openings formed in bottom axle seat. In this manner, top block, leaf spring, top axle seat, axle, and the bottom axle seat are rigidly clamped together when nuts are tightened onto the ends of the U-bolts.

The top axle seat and the bottom axle seat each are rigidly connected to the axle near its outboard end utilizing line welds. A line weld is a weld that begins at one point and ends at a separate point. The starting point of the line weld and the end point of the line weld create an area that is susceptible to stress, known as stress risers. As a result, the starting point and end point of the line weld include undesirable areas of stress risers. Thus, when a component is line welded to a hollow axle central tube, an area on the axle wall adjacent each weld endpoint is created that is generally more susceptible to stress than a non-welded area, or to areas that employ other types of welds.

As a result, when forces and resulting loads act upon the axle, a line welded area along the axle central tube is generally more susceptible to failure from such forces and/or loads than a non-welded area. In order to compensate for the increased susceptibility to stress that is caused by line welds, the wall thickness of the axle typically is increased, which undesirably increases the amount of material used to manufacture the axle, and also undesirably increases the weight of the axle.

As a result, a need has existed in the art for a spring axle/suspension system that overcomes the disadvantages of prior art systems by reducing stress risers associated with line welding a spring seat to the axle, thereby enabling the use of a thin-wall axle and reducing the weight and cost of the system. The mechanical axle/suspension spring seat for thin-wall axles of the present invention satisfies this need.

SUMMARY OF THE INVENTION

An objective of the present invention is to provide a spring seat for a mechanical axle/suspension system that eliminates the use of line welds of the prior art, thereby decreasing stress risers.

Another objective of the present invention is to provide a spring seat for a mechanical axle/suspension system that enables the use of a thin-wall axle, thereby facilitating reduced weight and reduced operating costs for the mechanical axle/suspension system.

These objectives and advantages are obtained by a spring seat for a mechanical spring axle/suspension system. The seat secures a mechanical spring of the axle/suspension system to an axle of the axle/suspension system. The spring seat comprises a body configured to seat on the axle and the body forms at least one window when disposed on the axle. The body is rigidly attached to the axle by a continuous weld formed in the window, and the spring seat is free of a line weld between the body and the axle.

BRIEF DESCRIPTION OF THE SEVERAL VIEWS OF THE DRAWINGS

The preferred embodiments of the present invention, illustrative of the best modes in which applicants have contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENT

Figure 1:
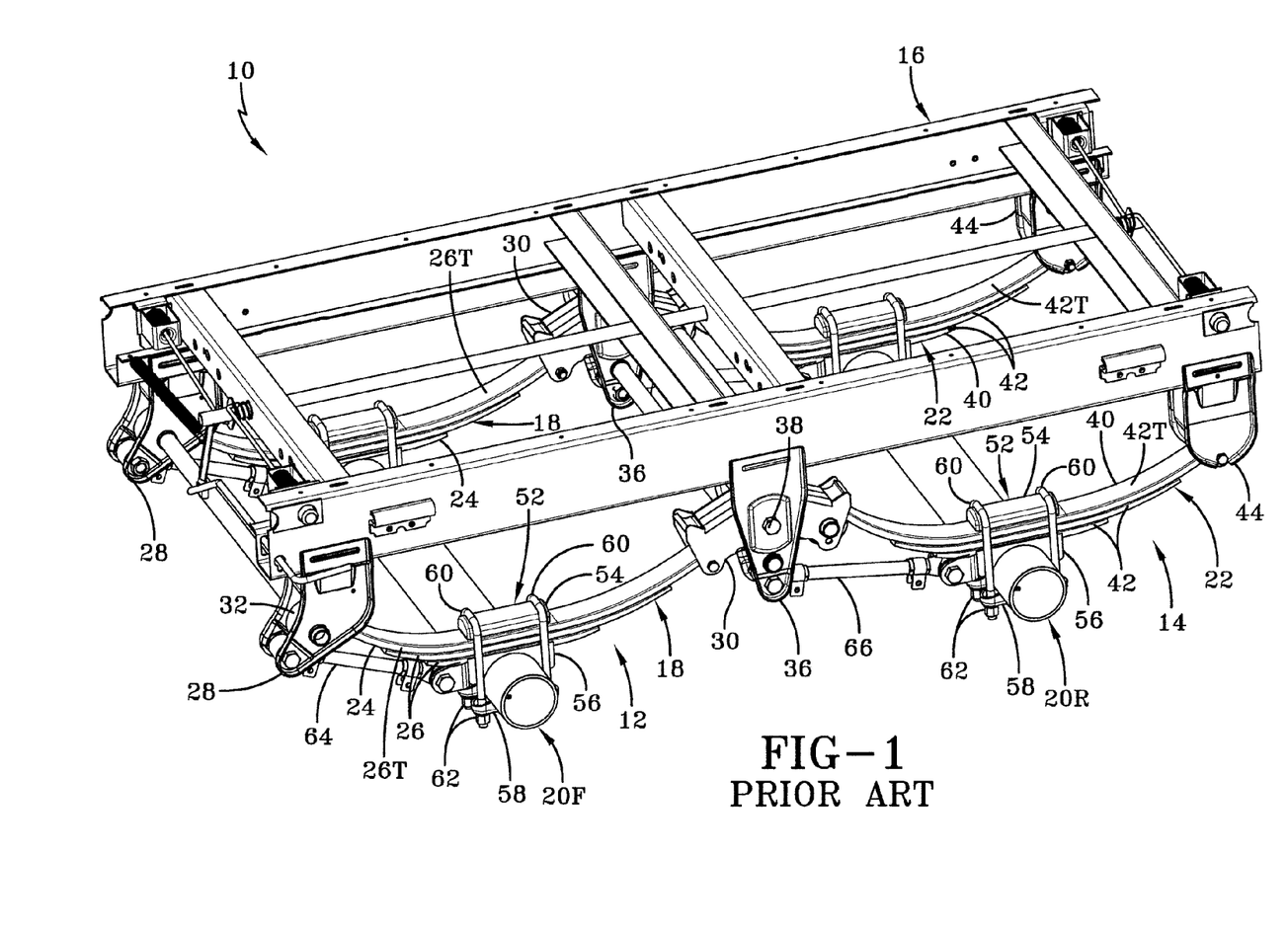
FIG. 1 is a driver's side top-front perspective view of a prior art trailer tandem mechanical spring axle/suspension assembly, shown in an over-slung configuration and mounted on a vehicle subframe, utilizing a first prior art spring seat.

In order to better understand the axle/suspension system spring seat for thin-wall axles of the present invention, a prior art spring axle/suspension system employing a first prior art spring seat is indicated generally at 10 and is shown in FIG. 1. Prior art spring axle/suspension system 10 is a tandem axle/suspension system, utilizing a front axle/suspension system 12 and a rear axle/suspension system 14, each of which is connected to and depends from a vehicle frame or subframe 16, as known in the art. As mentioned above, in some heavy-duty vehicles, the axle/suspension systems are connected directly to the primary frame of the vehicle, while in other heavy-duty vehicles, the primary frame of the vehicle supports a movable or non-movable subframe, and the axle/suspension systems connect directly to the subframe. For the purpose of convenience, reference herein will be made to subframe 16, with the understanding that such reference is by way of example, and that the present invention applies to heavy-duty vehicle primary frames, movable subframes and non-movable subframes.

Front axle/suspension system 12 includes a pair of transversely-spaced, longitudinally-extending mechanical spring axle/suspension assemblies 18, which connect to a front axle 20F. Similarly, rear axle/suspension system 14 includes a pair of transversely-spaced, longitudinally-extending mechanical spring axle/suspension assemblies 22, which connect to a rear axle 20R. Inasmuch as each one of the pair of front mechanical spring axle/suspension assemblies 18 is identical to the other, and each one of the pair of rear mechanical spring axle/suspension assemblies 22 is identical to the other, only one of each will be described herein.

Front mechanical spring axle/suspension assembly 18 includes a leaf spring set or stack 24, which in turn includes a plurality of leaf springs 26. Rear mechanical spring axle/suspension assembly 22 includes a leaf spring set or stack 40, which in turn includes a plurality of leaf springs 42. It is to be noted that first prior art spring axle/suspension system 10 is shown in FIG. 1 in what is referred to in the art as an over-slung configuration, in which front spring stack 24 is disposed above front axle 20F and rear spring stack 40 is disposed above rear axle 20R.

Turning first to front mechanical spring axle/suspension assembly 18, top leaf spring 26T of each spring stack 24 extends longitudinally between a front hanger 28, which is mounted on and depends from subframe 16 in a manner known to those skilled in the art, and an equalizer or rocker 30. More particularly, a front end 32 of top spring 26T is formed to enable the front end of the top spring to rest on and engage a cam or slipper block (not shown) that is mounted in front hanger 28. A rear end (not shown) of top spring 26T is formed to enable the rear end of the top spring to rest on and engage a cam or slipper block (not shown) that is mounted in equalizer 30. Equalizer 30 in turn is pivotally connected to a center hanger 36 by a pin and bushing assembly 38, and the center hanger is mounted on and depends from subframe 16 as known in the art. This construction enables top spring 26T and thus front spring stack 24 to float or slide at front and center hangers 28, 36, respectively, to respond to certain load conditions. As known in the art, equalizer 30 also provides a connection between front and rear axle/suspension assemblies 18, 22, respectively, and pivots in order to attempt to balance the loads between front and rear axles 20F, 20R.

Turning next to rear mechanical spring axle/suspension assembly 22, top leaf spring 42T of each spring stack 40 extends longitudinally between equalizer 30 and a rear hanger 44, which is mounted on and depends from subframe 16 as known in the art. More particularly, a front end (not shown) of top spring 42T is formed to enable the front end of the top spring to rest on and engage a cam or slipper block (not shown) that is mounted in equalizer 30. A rear end (not shown) of top spring 42T is formed to enable the rear end of the top spring to rest on and engage a cam or slipper block (not shown) that is mounted in rear hanger 44. In this manner, top spring 42T and thus rear spring stack 40 are able to float or slide at center and rear hangers 36, 44, respectively, to respond to certain load conditions.

The plurality of leaf springs 26 of front leaf spring stack 24 are held together by a center bolt (not shown), and are clamped to front axle 20F by a clamp assembly 52. More particularly, center bolt extends through an opening (not shown) formed in each one of front leaf springs 26 at about the longitudinal midpoint of each one of the springs, and interconnects the springs. Clamp assembly 52 includes a top block 54 that is disposed on the upper surface of top spring 26T at about the longitudinal midpoint of the top spring, a top spring seat 56 that extends between the bottom of front spring stack 24 and the upper portion of front axle 20F in vertical alignment with the top block, and a bottom spring seat 58 which is disposed on the lower portion of the front axle in vertical alignment with the top block and the top spring seat. It is to be understood that a spring seat is also referred to in the art as an axle seat, and reference herein shall be made to a spring seat for the purpose of convenience. Clamp assembly 52 also includes a pair of U-bolts 60, each one of which engages top block 54 and extends through a pair of openings (not shown) formed in bottom spring seat 58. In this manner, top block 54, front spring stack 24, top spring seat 56, axle 20F, and bottom spring seat 58 are rigidly clamped together when nuts 62 are tightened onto U-bolts 60. It is understood that leaf springs 42 of rear leaf spring stack 40 are held together by center bolt (not shown) and are clamped to rear axle 20R by clamp assembly 52 in a manner similar to that as described for front leaf springs 26 of front leaf spring stack 24.

In order to control fore-aft movement of front axle 20F, a front radius rod 64 is pivotally connected to and extends between front hanger 28 and front axle top spring seat 56. Likewise, to control fore-aft movement of rear axle 20R, a rear radius rod 66 is pivotally connected to and extends between center hanger 36 and rear axle top spring seat 56. A brake chamber mounting bracket (not shown) is attached, or connected, to each axle 20F, 20R, typically by welding, inboardly of top spring seat 56 to enable the mounting of brake system components (not shown) on spring axle/suspension system 10.

This design of first prior art spring axle/suspension system 10 enables the system to generally adequately react to the forces that act on the system and the resulting loads that are encountered by the system. However, prior art spring axle/suspension system 10 requires the use of line welds to connect clamp assembly 52 to axle 20F, 20R. More specifically, clamp assembly 52 is connected to axle 20F, 20R by a line weld that begins at one point and ends at a separate point. At the starting point and end point of the line weld, stress risers are generally increased. In order to compensate for the increased susceptibility to stress that is caused by line welding clamp assembly 52 to axle 20F,20R the wall thickness of the axle typically is increased. Such an increase in wall thickness undesirably increases the amount of material used to manufacture axle 20F,20R undesirably increasing the weight of the axle, in turn undesirably increasing manufacturing costs and fuel consumption.

Figure 2:
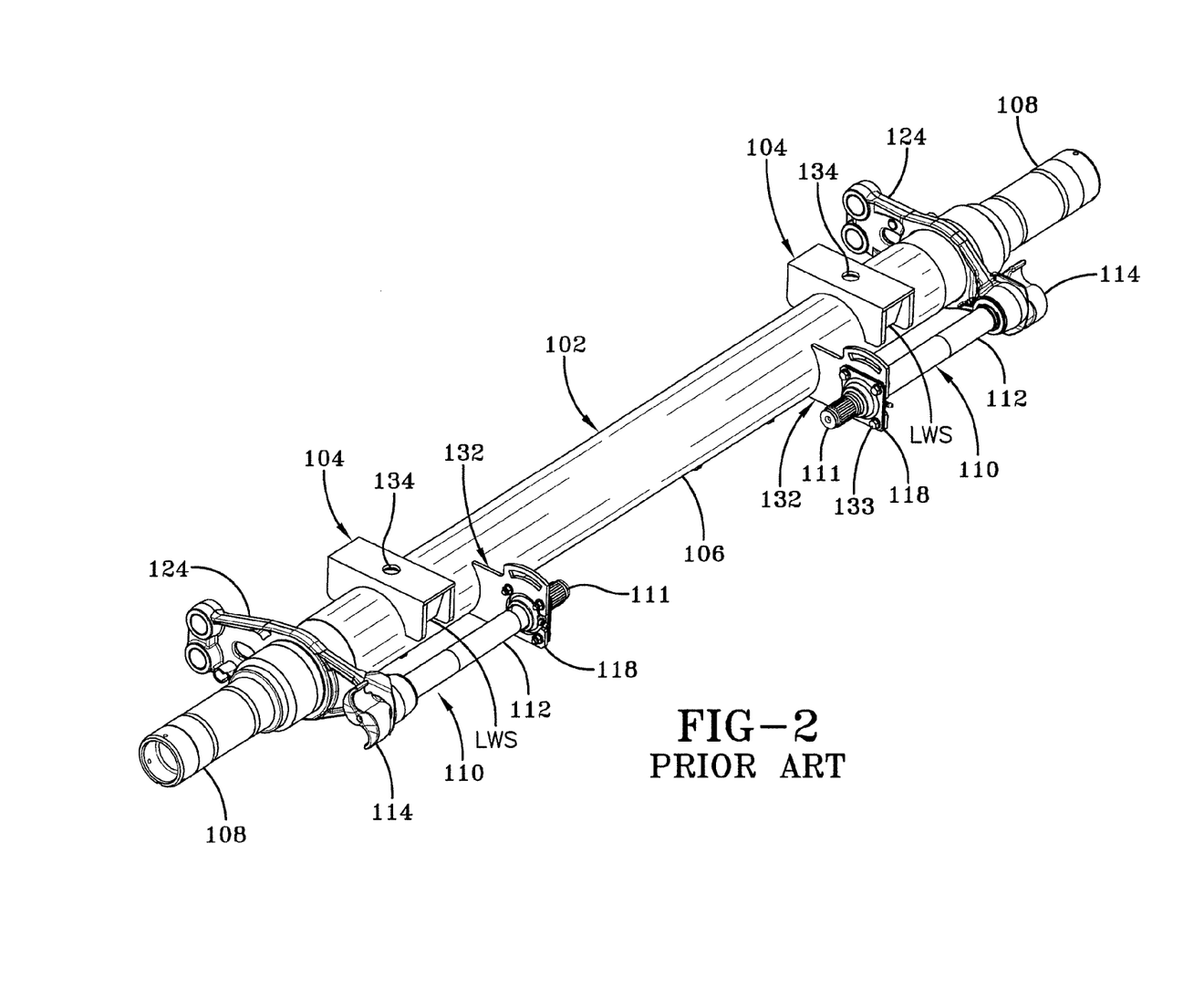
FIG. 2 is a top perspective view of portions of a prior art clamp assembly utilizing a second prior art spring seat, shown connected to an axle.
Figure 3:
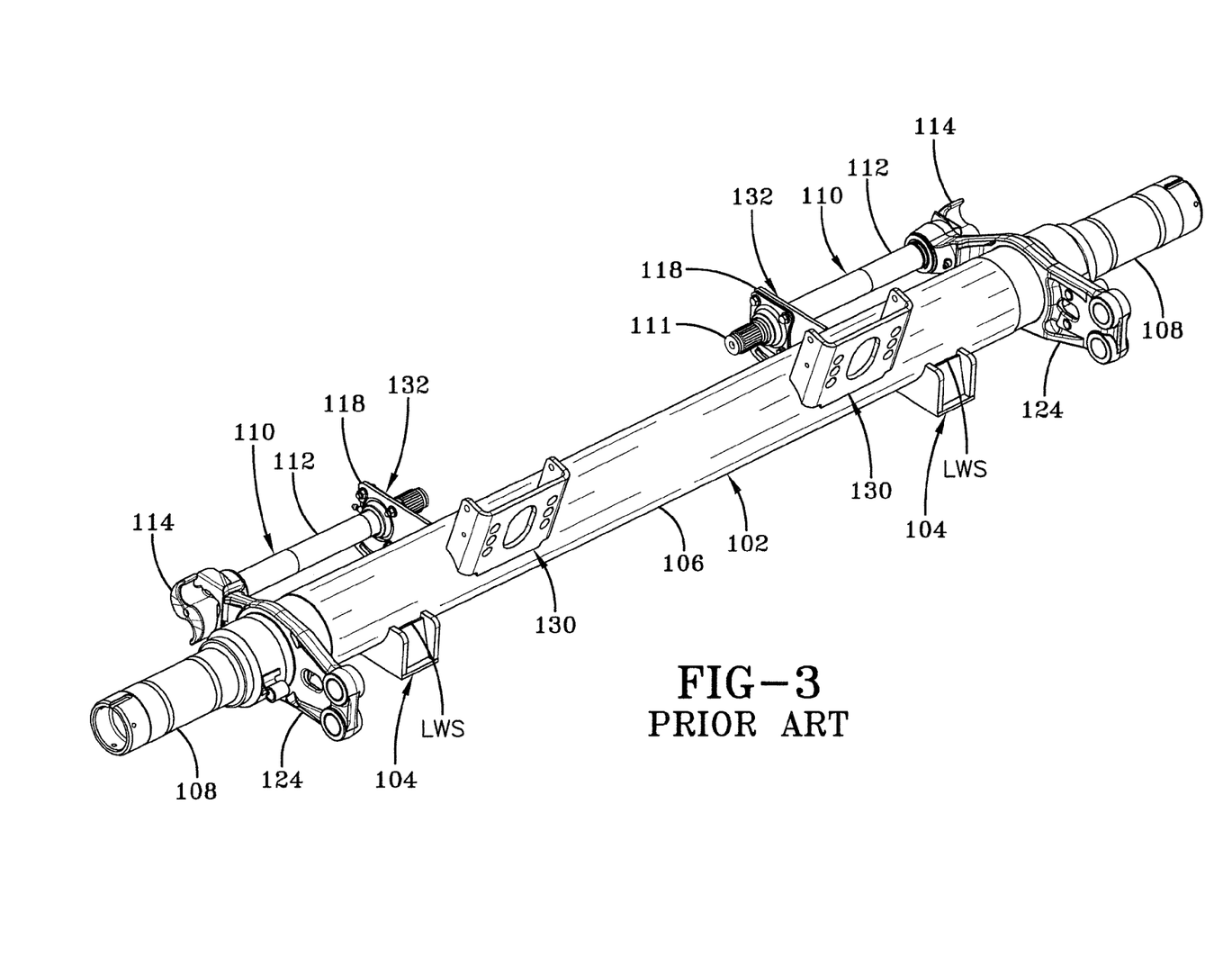
FIG. 3 is a bottom perspective view of portions of the clamp assembly and axle shown in FIG. 2.
Figure 4:
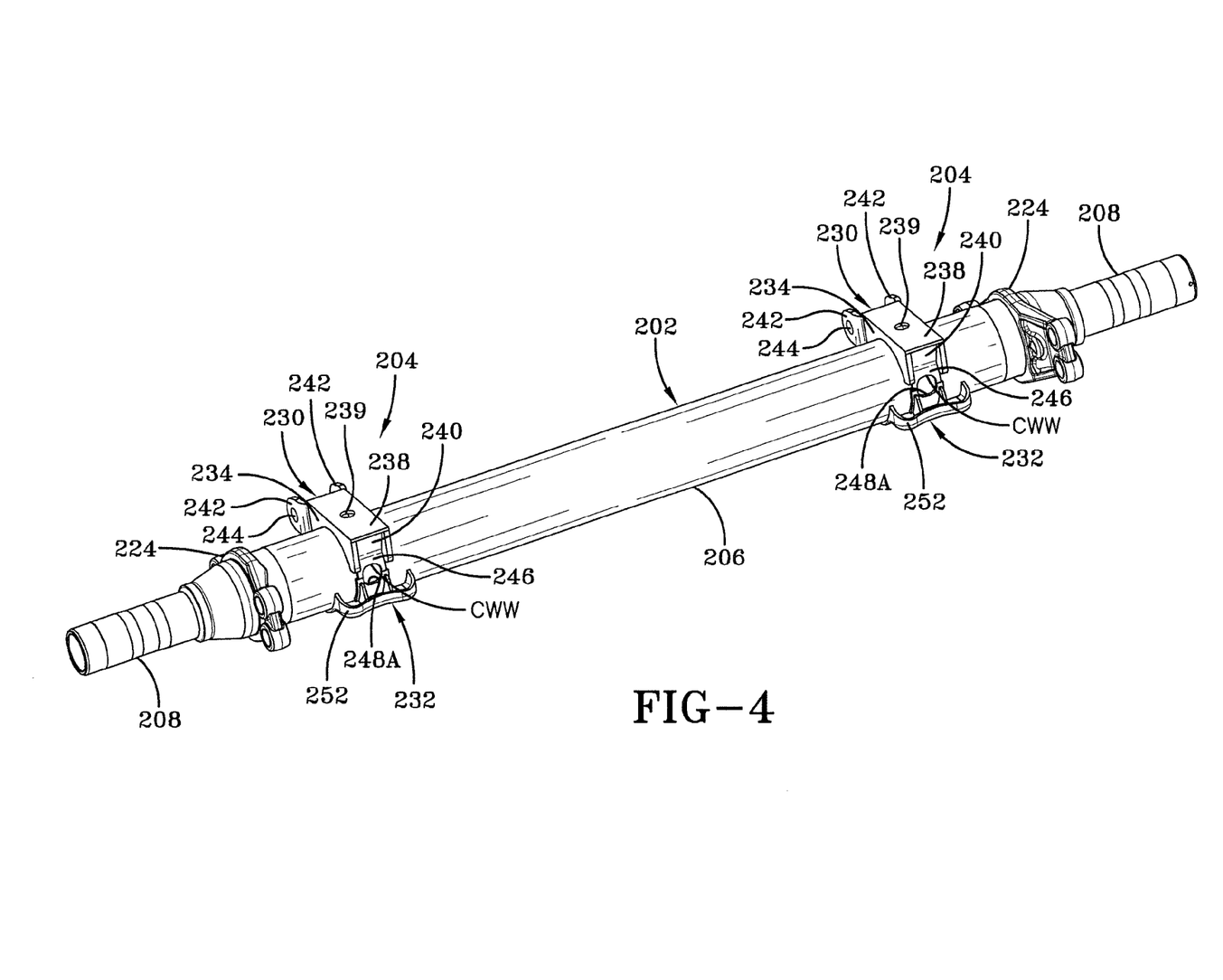
FIG. 4 is a top perspective view of a first embodiment mechanical axle/suspension spring seat of the present invention attached to an axle and shown in an over-slung spring axle/suspension system configuration.
Figure 5:
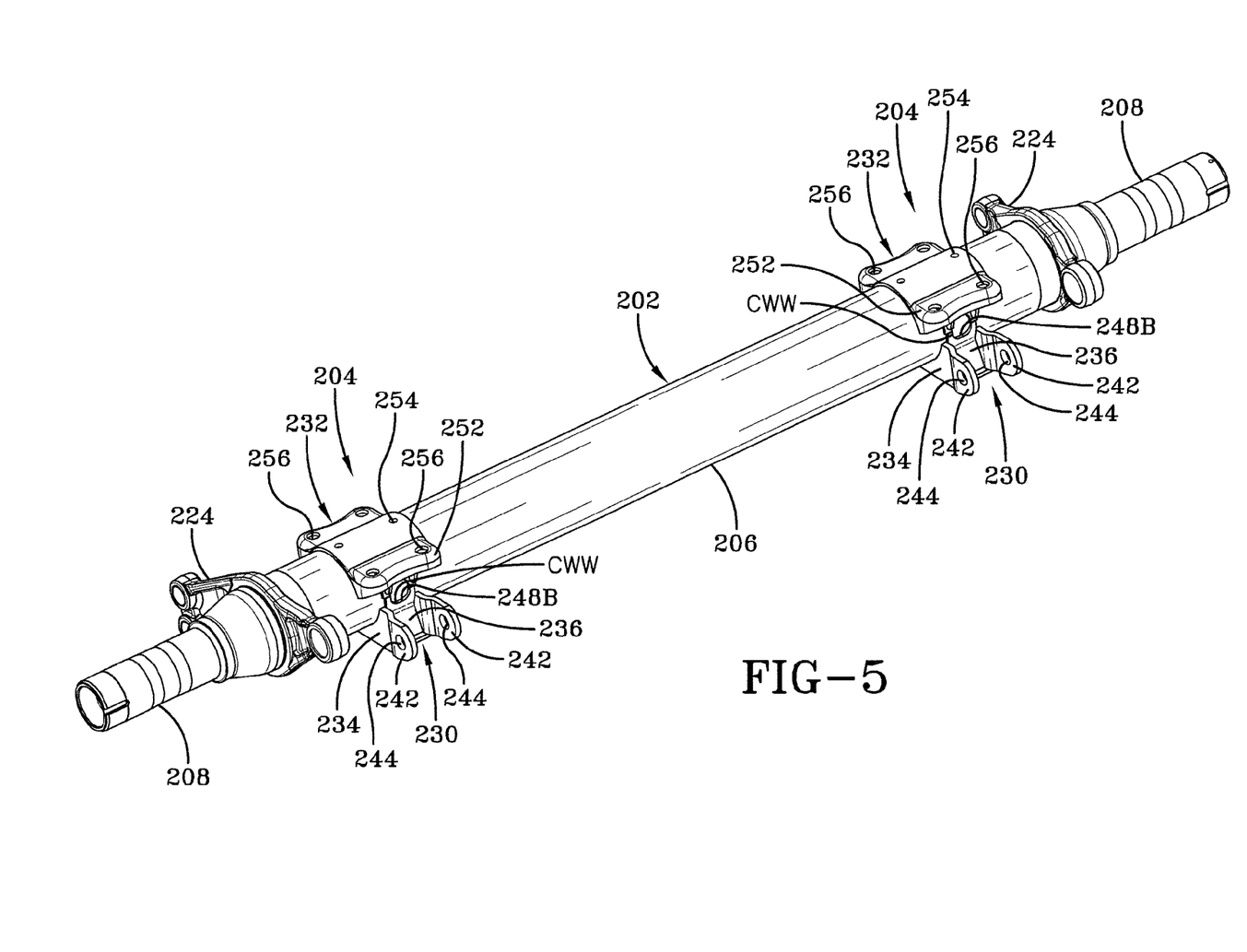
FIG. 5 is a bottom rear perspective view of the spring seat shown in FIG. 4.

Turning to FIGS. 2-3, a portion of a prior art clamp assembly employing a second prior art spring seat is shown at 104, and is rigidly connected to an axle 102. Axle 102 includes an axle central tube 106 and an axle spindle 108 that is integrally connected by any suitable means, such as welding, to each end of the central tube. It is to be noted that clamp assembly employing second prior art spring seat 104 is shown in FIGS. 2-3 in what is referred to in the art as an under-slung configuration, in which front spring stack 24 (FIG. 1) is disposed below axle 102 and rear spring stack 40 (FIG. 1) is disposed below the axle.

For the sake of completeness, components of a brake system (not shown), including a cam shaft assembly 110, a cam shaft 111, a cam tube 112, an S-cam 114, a cam shaft bracket 118, a brake spider 124, a brake chamber mounting bracket 130, a cam shaft assembly mounting bracket 132, are shown attached to axle 102.

Prior art spring seat 104 is generally U-shaped to surround axle 102. More specifically, prior art spring seat 104 includes a curve that is configured to facilitate a clearance fit to seat on axle 102 and clamp to the axle. Additionally, to rigidly attach prior art spring seat 104, line welds, indicated at LWS, is are utilized. Line welds, as is known in the art, begin at one point and end at a separate point. The starting point and the ending point of the line weld LWS are areas that are susceptible to stress. As a result of connecting prior art spring seat 104 to axle 102 using line weld LWS, undesirable stress risers are created at the beginning point and end point of line weld LWS. The use of line welds to rigidly connect cam shaft assembly mounting bracket to the axle also undesirably requires increasing the thickness of the axle. More particularly, it is known in the art that the portion of the axle central tube which is between the leaf spring stacks is a high-stress area, due to the transmission of forces and the creation of resulting loads across the axle between the leaf spring stacks during vehicle operation. When a component is line welded to a hollow axle central tube, an area on the axle wall adjacent the weld is created that is generally more susceptible to stress than a non-welded area, or to areas that employ other types of welds.

As a result, when forces and resulting loads act upon the axle, a line welded area along the axle central tube is generally more susceptible to failure from such forces and/or loads than a non-welded area. In order to compensate for the increased susceptibility to stress that is caused by line welds, the wall thickness of the axle typically is increased, which undesirably increases the amount of material used to manufacture the axle, and also undesirably increases the weight of the axle. Thus, in the prior art, the use of a prior art spring seat that is line welded to the axle central tube has required the use of a relatively thick-walled axle, such as about a wall thickness of about one-half of an inch (0.500 inches) or higher. Such a thick-walled axle undesirably increases the weight and the undesirably increases the cost associated with the axle/suspension system.

As a result, a need exists in the art for a spring axle/suspension system that minimizes line welds, and associated stress risers, when connecting prior art spring seat to the axle, thereby enabling the use of a thin-wall axle and reducing the weight and cost of the system. The mechanical axle/suspension spring seat for thin-wall axles of the present invention satisfies this need, and is described in detail below.

Turning to FIGS. 4-7, a first embodiment mechanical axle/suspension spring seat of the present invention is indicated at 204. First embodiment mechanical axle/suspension spring seat 204 is generally utilized in an overslung spring axle/suspension system (not shown), in which springs (not shown) are disposed above or over a thin-wall axle 202. Axle 202 includes an axle central tube 206 and a pair of axle spindles 208. For sake of completeness, a brake spider 224 is shown mounted on axle 202.

Figure 6:
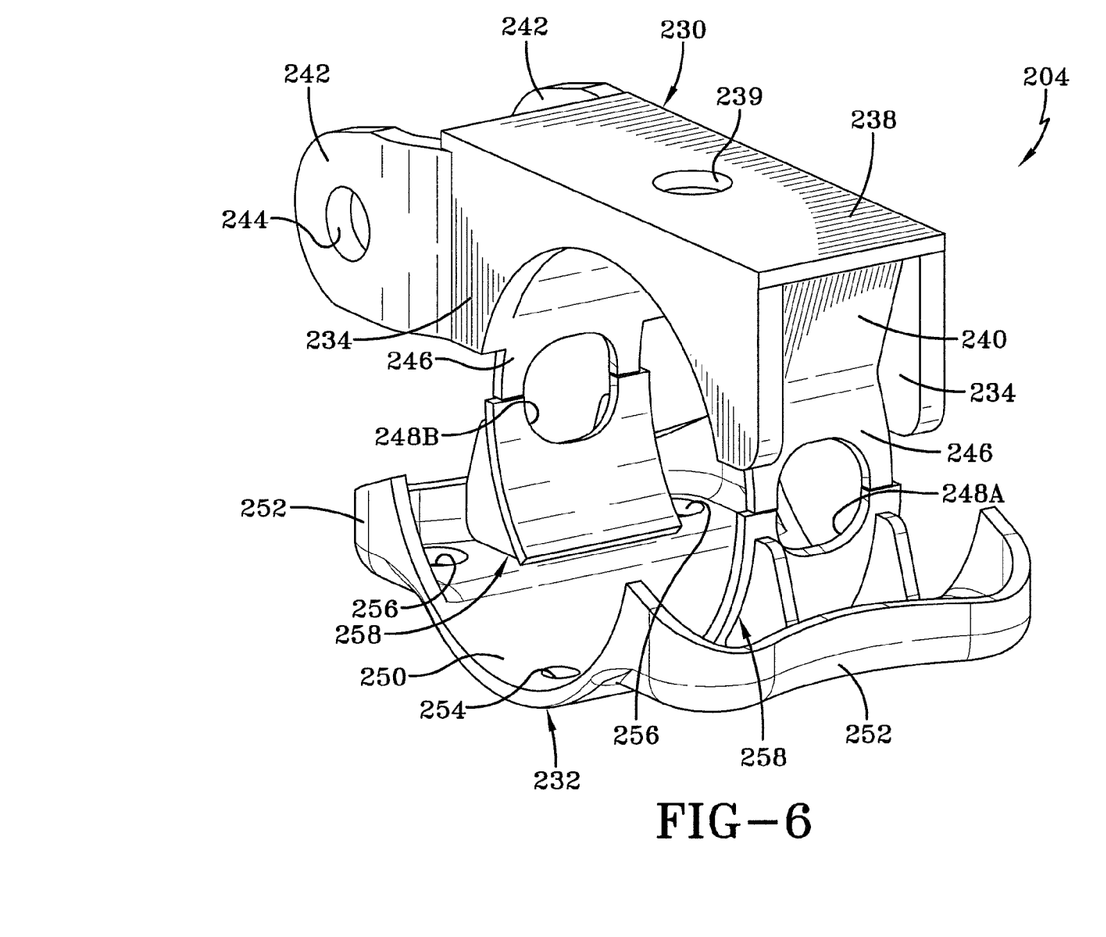
FIG. 6 is an enlarged top front driver-side perspective view of the spring seat shown in FIG. 4, removed from the axle.
Figure 7:
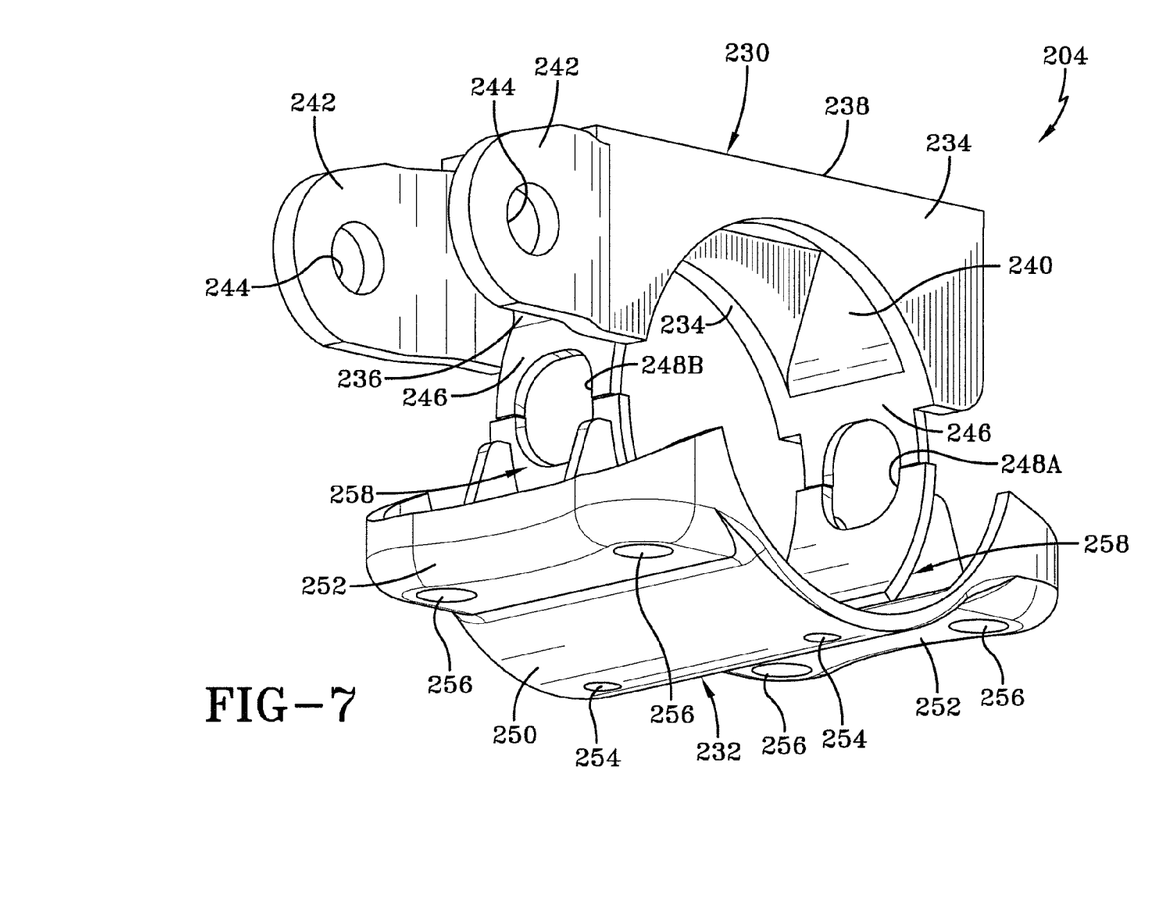
FIG. 7 is an enlarged bottom rear passenger-side perspective view of the spring seat shown in FIG. 4.

As more clearly shown in FIGS. 6-7, first embodiment mechanical axle/suspension spring seat 204 of the present invention includes a first portion, or first body 230, a second portion, or second body 232 and a top block 54 (FIG. 1). First portion 230 is generally U-shaped and partially surrounds axle 202, as will be described below. Additionally, first portion 230 includes a pair of sidewalls 234, a radius wall 236, a spring wall 238, and an inclined wall 240. Spring wall 238 is generally rectangular in shape and is formed with an opening 239 to accept a pin (not shown), such as a dowel pin, that is disposed through a spring stack 26 (FIG. 1). Each one of sidewalls 234 is generally U-shaped and complementarily receive axle 202 in a press fit, or interference fit, manner. It is contemplated that first embodiment mechanical axle/suspension spring seat 204 could also include a clearance fit to mechanically engage axle 202. Additionally, a pair of radius rod brackets 242 extend outwardly from sidewalls 234. Each radius rod bracket 242 is formed with an opening 244, respectively, to facilitate a pivotal connection with radius rod (not shown). A pair of upper window portions 246 is located adjacent to pair of sidewalls 234 and spring wall 238 and adjacent to the pair of sidewalls and inclined wall 240. Upper window portions 246 are generally U-shaped and form a portion of a window 248A,B, as will be discussed below.

Second portion 232 of first embodiment mechanical axle/suspension spring seat 204 of the present invention includes a generally U-shaped axle portion 250 and a pair of end portions 252. Axle portion 250 generally partially surrounds axle 202 and is formed with a pair of openings 254 utilized during the manufacturing process. End portions 252 are formed with a pair of openings 256 to receive U-bolts (not shown) to attach spring stacks 26 (FIG. 1) to mechanical axle/suspension spring seat 204. Spring seat 204 includes a pair of lower window portions 258 that are rigidly connected to each respective end portion 252. Each lower window portion 258 extends outwardly from a respective end portion 252 of second portion 232 and includes a generally U-shaped end portion. Lower window portion 258 and upper window portion 246 form generally circular-shaped windows 248A,B, or openings, when seat 204 is disposed on axle 202.

In order to rigidly attach, or connect, mechanical axle/suspension spring seat 204 of the present invention to axle 202, first portion 230 and second portion 232 are configured to facilitate a press fit to seat on axle 202 and mechanically engage the axle. More specifically, when first portion 230 and second portion 232 are disposed on axle 202, window 248A is formed on the front quadrant of the axle and window 248B is formed on the rear quadrant of the axle, or near the horizontal neutral axis of the axle. The front quadrant and rear quadrant of axle 202 are generally considered a lower stress area of the axle when compared to the top and bottom portion of the axle thus further reducing potential stress risers. Windows 248A, 248B facilitate the connection to axle 202. More specifically, a continuous window weld, indicated by CWW, is utilized adjacent each window 248A,B of mechanical axle/suspension spring seat 204. The window weld is a continuous weld that starts and stops at the same point within window 248A,B. In this manner, windows 248A,B are welded to axle 202 by utilizing a continuous window weld connection to the front and rear quadrant of the axle or a lower stress area of the axle thus further reducing potential stress risers. In this manner, there are no separate beginning and end welding points like those found with line welds creating stress risers. Therefore, a continuous window weld eliminates stress risers that are generally associated with line welds. Moreover, it is typically understood that a continuous window weld is stronger than a line weld because of the continuity of the weld. Therefore, window welds CWW within windows 248A,B enable the use of a thin-wall axle 202 which reduces the weight and reduces the cost. Thin-wall axle 202 is generally considered to be an axle with a wall-thickness ranging from about 0.285 inches to about 0.45 inches.

First embodiment mechanical axle/suspension spring seat 204 of the present invention utilizes a press fit to seat on and mechanically engage axle 202 and utilizes a continuous window weld CWW within windows 248A,B to rigidly connect the spring seat to axle 202. Because continuous window weld CWW begins at one point and ends at the same point, stress risers associated with line welds are eliminated. Therefore, the minimization of the stress risers in spring seat 204 facilitate utilizing thin-wall axle 202, thereby reducing weight and reducing operating costs.

Figure 8:
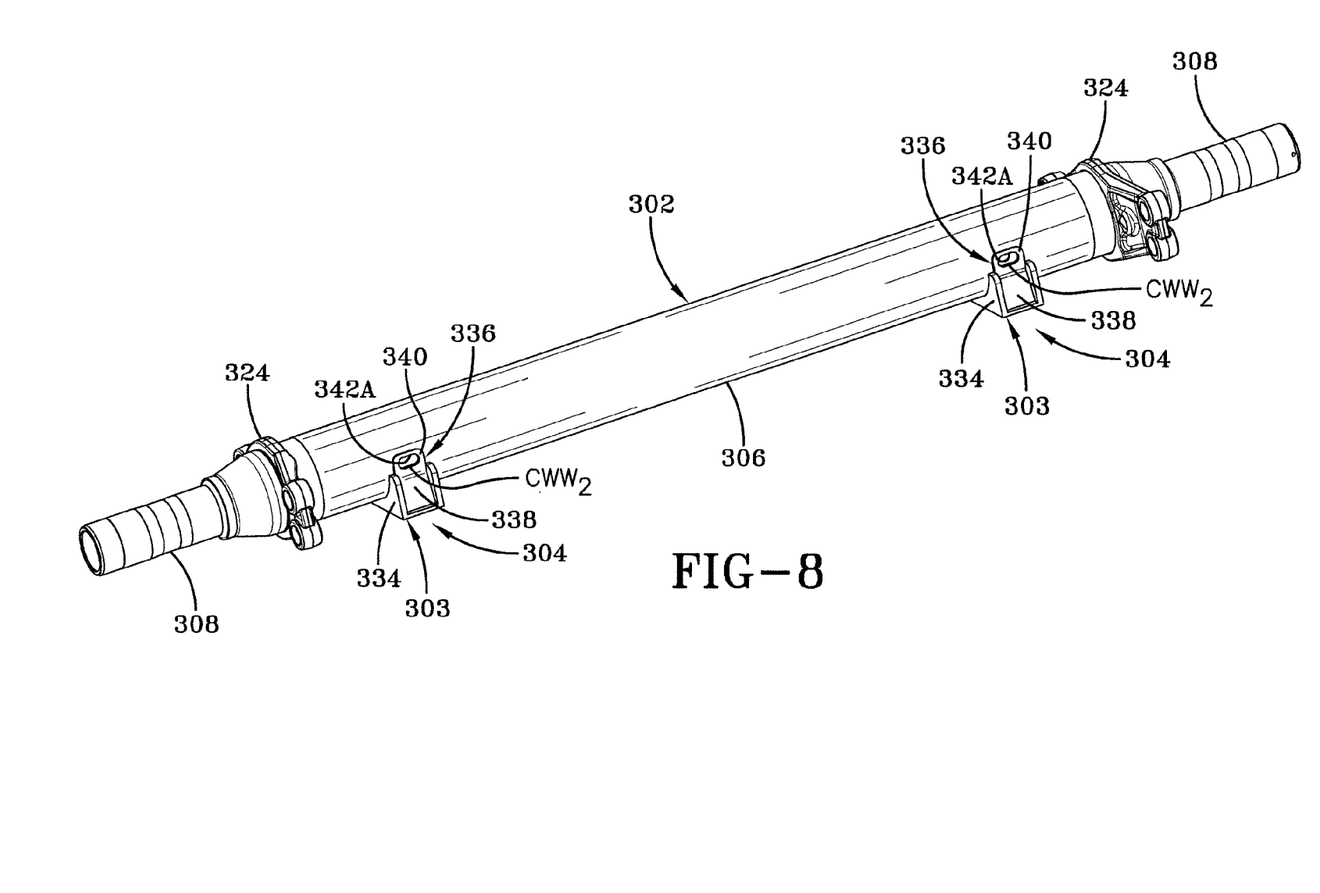
FIG. 8 is a top front perspective view of a second embodiment mechanical axle/suspension spring seat of the present invention attached to an axle and shown in an under-slung spring axle/suspension system configuration.
Figure 9:
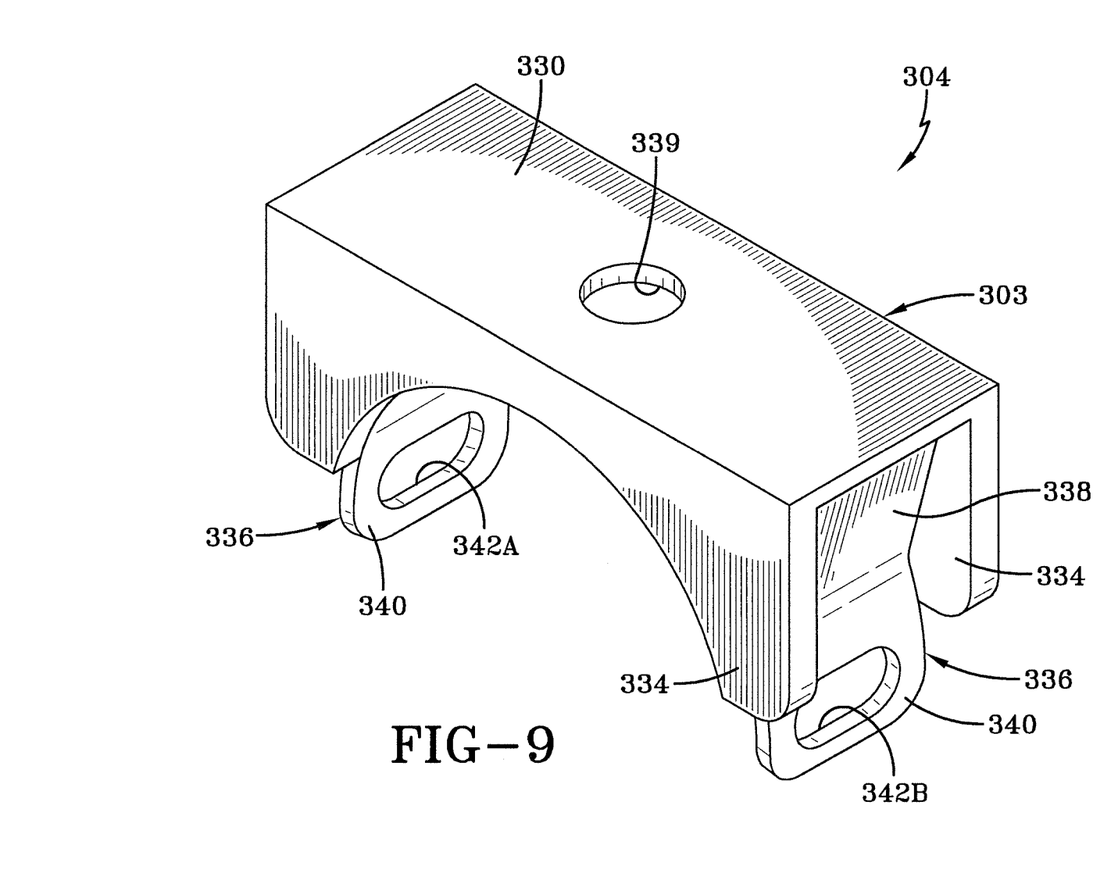
FIG. 9 is an enlarged bottom passenger-side perspective view of the spring seat, as shown in FIG. 8, removed from the axle.
Figure 10:
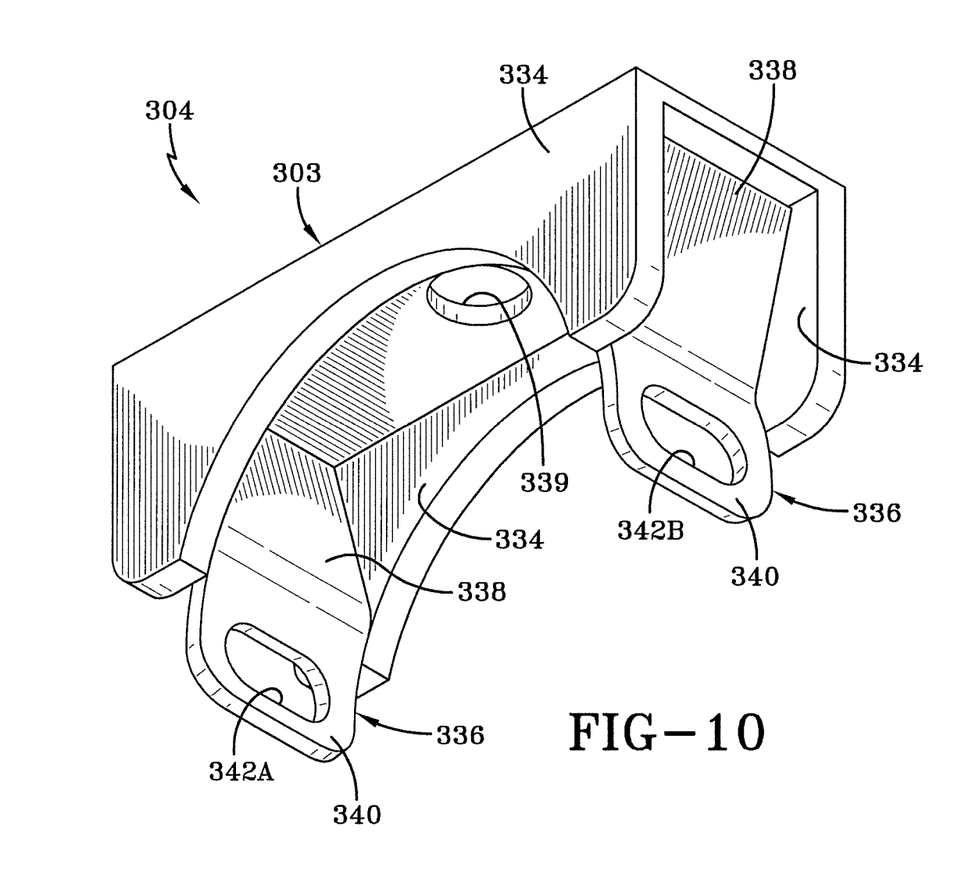
FIG. 10 is an enlarged bottom driver-side perspective view of the spring seat shown in FIG. 9.

Turning to FIGS. 8-10, a second preferred embodiment of mechanical suspension spring seat is indicated at 304. Second embodiment mechanical suspension spring seat 304 is generally utilized in an underslung spring axle/suspension system (not shown), in which the springs (not shown) are disposed below or under a thin-wall axle 302. Axle 302 includes an axle central tube 306 and axle spindles 308. For sake of completeness, a brake spider 324 is shown mounted on axle 302, as will be described below.

As more clearly shown in FIGS. 9-10, second embodiment mechanical axle/suspension spring seat 304 of the present invention includes a body 303 that is generally U-shaped and partially surrounds axle 302, as will be described below. More specifically, mechanical axle/suspension spring seat body 303 includes a spring wall 330, a pair of sidewalls 334, and a pair of window walls 336. Spring wall 330 is generally rectangular in shape and is formed with an opening 339 to accept a pin (not shown), such as a dowel pin, that is disposed through a spring stack 26 (FIG. 1). Each one of sidewalls 334 is generally U-shaped and complementarily receive axle 302. Although a pair of window walls 336 is shown, only one will be discussed. Window wall 336 includes an inclined portion 338 and a window portion 340 and is generally elongated U-shaped. Inclined portion 338 generally extends outwardly from spring wall 330 and the inclined portion extends around axle 302 less than 180 degrees. In an important feature of the invention, each window portion 340 is formed with a generally elliptical-shaped window 342A,B and facilitates rigid connection to axle 302. Additionally, window portion 340 extends around axle 302 more than 180 degrees when spring seat 304 of the present invention is disposed on axle 302. It is contemplated that window portion 340 may extend around axle 302 less than 180 degrees when spring seat 304 of the present invention is disposed on axle 302 without changing the overall concept or operation of the invention. More specifically, window 342A is disposed on front quadrant of axle 302 and window 342B is disposed on rear quadrant of the axle or near the horizontal neutral axis of the axle. Front and rear quadrants of axle 302 are generally considered a lower stress area of the axle further reducing potential stress risers. It is contemplated that windows 342A,B may be disposed above or below the horizontal neutral axis of axle 302. Even more specifically, a continuous window weld, indicated by $CWW_2$, located adjacent each window 342A,B rigidly connects second embodiment mechanical axle/suspension spring seat 304 to front and rear quadrants of axle 302.

Continuous window weld $CWW_2$ is a continuous weld that starts and stops at the same point within each window 342A,B. In this manner, second embodiment mechanical axle/suspension spring seat 304 is connected to axle 302 by utilizing a continuous window weld connection. It is typically understood that a continuous weld is stronger than a line weld because of the continuity of the weld. The continuity of the weld minimizes and/or eliminates stress risers associated with line welds. Therefore, the use of continuous window weld $CWW_2$ at window 342A,B reduces stress risers that are typically associated with line welds. Moreover, window welds $CWW_2$ within windows 342A,B reduce the stress risers in spring seat 304 and facilitate the use of a thin-wall axle 302 which reduces the weight and cost. Thin-wall axle 302 is generally considered to be an axle with a wall thickness of ranging from about 0.285 inches to about 0.45 inches.

Second embodiment mechanical axle/suspension spring seat 304 of the present invention utilizes a press fit, or an interference fit, to seat on and mechanically engage axle 302 and utilizes continuous window weld $CWW_2$ within windows 342A,B to rigidly connect the spring seat to axle 302. It is contemplated that second embodiment mechanical axle/suspension spring seat 304 could also include a clearance fit to mechanically engage axle 302. In this manner, stress risers associated with line welds are reduced as a result of the utilization of continuous window welds $CWW_2$ upon axle 302. The utilization of continuous window weld $CWW_2$ minimizes and/or eliminates the stress risers typically associated with line welds. The utilization of continuous window welds $CWW_2$ allows for thin-wall axle 302 to be employed thus desirably reducing weight and desirably reducing operating costs.

As a result, mechanical axle/suspension spring seats 204, 304 provide a construction that eliminates line welds, which reduces stress risers associated with line welds and enables thin-wall axles 202, 302 to be employed. More specifically, mechanical axle/suspension spring seats 204,304 utilize continuous window welds $CWW$, $CWW_2$, that begin at the same point and end at the same point. In this manner, stress risers typically associated with line welds are minimized or eliminated. Moreover, the use of continuous window welds $CWW$, $CWW_2$ enables the use of thin-wall axles 202, 302 which reduce weight and decrease cost.

It is to be understood that the structure of the above-described mechanical axle/suspension spring seat of the present invention 204, 304 may be altered or rearranged, or certain components omitted or added, without affecting the overall concept or operation of the invention. For example, windows 248A,B, 342A,B may include different sizes and/or shapes. Additionally, any number of windows 248A,B, 342A,B may be utilized. Sidewalls 234, 334 may include different shapes and/or configurations without affecting the overall concept or operation of the invention. Further, it is contemplated that first and second embodiment mechanical axle/suspension spring seat 204, 304 may be constructed out of various materials including metal, composite, or other suitable materials as known by those in the art.

Moreover, lower window portion 258 and end portion 252 may be formed as a single piece. As described above, it is also to be understood that the above-described spring seat of the present invention 204, 304 may be employed in conjunction with any type of spring axle/suspension system without affecting the overall concept or operation of the invention. In addition, the invention applies to various types of frames used for heavy-duty vehicles, including primary frames that do not support a subframe and primary frames and/or floor structures that do support a movable or non-movable subframe.

Accordingly, the mechanical axle/suspension spring seat of the present invention is simplified, provides an effective, safe, inexpensive and efficient structure and method which achieves all the enumerated objectives, provides for eliminating difficulties encountered with prior art spring seats, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the mechanical axle/suspension spring seat of the present invention is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A spring seat for a mechanical spring axle/suspension system, said seat securing at least one leaf spring of said mechanical spring axle/suspension system to an axle of the axle/suspension system, said spring seat comprising:
    at least one body configured to seat on said axle, said at least one body forming at least one window when disposed on the axle;
    said at least one body being directly rigidly attached to said axle by a continuous weld formed in said at least one window; and
    said spring seat being free of a line weld between said at least one body and said axle, whereby said at least one leaf spring seats on said at least one body to secure the at least one leaf spring to said axle.

2. The spring seat for a mechanical spring axle/suspension system of claim 1, wherein said body includes a generally U-shape.

3. The spring seat for a mechanical axle/suspension system of claim 1, wherein said window is generally circular-shaped.

4. The spring seat for a mechanical axle/suspension system of claim 1, wherein said window is generally elliptical.

5. The spring seat for a mechanical axle/suspension system of claim 1, wherein said window is located on a front quadrant of said axle.

6. The spring seat for a mechanical axle/suspension system of claim 1, wherein said window is located on a rear quadrant of said axle.

7. The spring seat for a mechanical axle/suspension system of claim 1, wherein said at least one window includes a pair of windows, each one of said windows being located generally opposite one other on said axle.

8. The spring seat for a mechanical axle/suspension system of claim 1, wherein said at least one body includes a first body and a second body, said first and second bodies forming said at least one window when disposed on said axle.

9. The spring seat for a mechanical axle/suspension system of claim 1, further comprising a clamp assembly including at least one U-bolt for securing together said at least one leaf spring, said spring seat, and said axle.

10. A clamp assembly for a mechanical spring axle/suspension system, said clamp assembly securing at least one leaf spring of said mechanical spring axle/suspension system to an axle of the axle/suspension system, said clamp assembly comprising:
    a spring seat including:
        at least one body configured to seat on said axle, said at least one body forming at least one window when disposed on the axle;
        said at least one body being directly rigidly attached to said axle by a continuous weld formed in said at least one window; and said spring seat being free of a line weld between said at least one body and said axle; and at least one U-bolt for securing together said at least one leaf spring, said spring seat, and said axle.

11. The clamp assembly for a mechanical axle/suspension system of claim 10, wherein said at least one window includes a pair of windows, each one of said windows being located generally opposite one other on said axle.

12. The clamp assembly for a mechanical axle/suspension system of claim 10, wherein said at least one body includes a first body and a second body, said first and second bodies forming said at least one window when disposed on said axle.

\* \* \* \* \*